(12) United States Patent
Donakowski

(10) Patent No.: US 7,150,070 B2
(45) Date of Patent: Dec. 19, 2006

(54) HUBLESS CASTER

(76) Inventor: William J. Donakowski, 131 Creekside Ct., El Sobrante, CA (US) 94803

( * ) Notice: Subject to any disclaimer, the term of this patent is extended or adjusted under 35 U.S.C. 154(b) by 195 days.

(21) Appl. No.: 11/033,326

(22) Filed: Jan. 10, 2005

(65) Prior Publication Data

US 2005/0120514 A1   Jun. 9, 2005

(51) Int. Cl.
*B60B 33/00* (2006.01)
(52) U.S. Cl. .................. 16/45; 16/46; 16/47; 16/18 R
(58) Field of Classification Search ............. 16/45–47, 16/18 R, 18 A; 301/5.1, 7
See application file for complete search history.

(56) References Cited

U.S. PATENT DOCUMENTS

| 285,912 | A | * | 10/1883 | Meehan | 16/47 |
|---|---|---|---|---|---|
| 978,161 | A | | 12/1910 | Holmes | |
| 3,997,938 | A | * | 12/1976 | Pinaire et al. | 16/45 |
| 4,045,096 | A | * | 8/1977 | Lidov | 305/7 |
| 4,544,425 | A | * | 10/1985 | Provolo | 156/73.1 |
| 5,068,943 | A | * | 12/1991 | Estkowski et al. | 16/18 A |
| 5,119,525 | A | * | 6/1992 | Melara | 16/18 R |
| 5,419,619 | A | * | 5/1995 | Lew | 301/5.1 |
| 6,336,685 | B1 | * | 1/2002 | Orr | 301/164.701 |
| 6,748,623 | B1 | * | 6/2004 | Tsai | 16/47 |

FOREIGN PATENT DOCUMENTS

| CH | 477999 | 10/1969 |
|---|---|---|
| DE | 93 16 374 | 3/1994 |
| DE | 101 28 099 | 12/2002 |
| GB | 967915 | 8/1964 |
| GB | 2272366 A * | 5/1994 |

OTHER PUBLICATIONS

Form magazine, No. 122 II, 1988, p. 21-23.

* cited by examiner

*Primary Examiner*—Chuck Y. Mah
*Assistant Examiner*—Michael J. Kyle
(74) *Attorney, Agent, or Firm*—Howard Cohen

(57) ABSTRACT

A hubless caster assembly includes a caster body and at least one wheel, the wheel comprising a toroidal member having a bearing race, and a complementary bearing race supported by the caster body. Bearing elements in the races support the wheel in free rotation. The caster body may comprise a ring body having an axial opening, whereby the caster assembly has a large central aperture extending entirely therethrough. A centering ring may be secured in the axial opening with the complementary bearing race formed therein. A hub cap with visual treatment may be secured over the central aperture.

12 Claims, 9 Drawing Sheets

HUBLESS CASTER

CROSS-REFERENCE TO RELATED APPLICATIONS

This application claims priority based on application Ser. No. 10/161,535, now U.S. Pat. No. 6,839,939, issued Jan. 11, 2005, which is based on U.S. Provisional Patent Application Ser. No. 60/295,592, filed Jun. 4, 2001.

FEDERALLY SPONSORED RESEARCH

Not applicable.

SEQUENCE LISTING, ETC ON CD

Not applicable.

BACKGROUND OF THE INVENTION

1. Field of the Invention

The present invention relates generally to a caster and more specifically to a hubless caster for use in office furniture (chairs, tables, desks) as well as other devices or conveyances used primarily for transport of materials and pushed by hand (grocery carts, wagons). This new device is a caster that allows better inherent stability, easier rolling, and affords easy customization to enhance the overall aesthetic of the supported object (chair, table, cart, file cabinet, or other pieces of furniture). For the purpose of this patent, the attached device will assumed to be an office chair.

2. Description of Related Art

It can be appreciated that casters have been in use for decades. Casters are located between the chair and the floor on which the chair is rolling, and are usually used in groups of 4 or 5 per end device. Typically, caster designs tend to fall into one of two groups: the 'single wheel' and the 'twin wheel'. The single wheel caster consists of one wheel with an axle through the center which is attached to a support base. The support base is fixed to the chair (or other object) by use of a vertical pin that allows the caster to pivot about a generally vertical axis while also permitting rotation of the wheel about a generally horizontal axis, thereby allowing the caster to move in any direction.

The other main type of caster design is the 'twin wheel' caster, which is identical to the first mentioned except two wheels are used instead of one. The two wheels share a common axle, but are free to rotate separately. The axle is affixed to the vertically extending base at a location in the middle of the two wheels. In this way, each wheel is free to rotate in opposite directions, facilitating a change in direction of the chair direction. Also, the wheels may turn in the same direction for straight-line movement of the chair.

The main problem of the 'single wheel' caster is its inability to turn easily about the pin pivot. The wheel needs to rotate about the straight line formed by the wheel's contact with the horizontal floor. Effectively, a portion of the contacting wheel needs to drag on the floor instead of freely rolling. Additionally, the central axle running through the centerline of the wheel is supported at the outsides of the wheel. These outside locations are unprotected from any collisions with other chairs or walls, often leading to a bent axle, which seriously impairs the usability of the caster. This design is still available though is less commonly used in modern office furniture.

The 'twin wheel' caster offered an improvement over the 'single wheel' in two important regards. The ability of the wheels to rotate in opposite directions at the same time greatly enhanced the ability to turn about the vertical pivot, making a change in overall direction of the chair very smooth. Also, the support of the central axle to the chair in the middle of the two wheels afforded greater protection of the thin axles, greatly reducing the possibility of damage to the axle and subsequent loss of performance. One problem germane to this caster type is the method of attachment of the wheel to the axle. Unlike the single wheel with its axle attachment on the two faces of the wheel, the double wheel design attaches each wheel to its respective end of the axle, the axle support to the base being disposed between the two wheels. This attachment configuration creates some inherent stability inefficiencies. By not allowing the axle to go through the wheel, the loading of the wheel on the axle is not symmetric. That is, the inside of the wheel is fully loading the axle while the outside is not loading the axle at all. Also, the limited space remaining in the device for the wheel thickness results in thin wheels, which directly result in narrow annular (limited) bearing surfaces of the wheel on the axle.

The overall attachment of the wheel to the axle is inherently not completely stable. With the simple method employing a pin (axle) in a hole (in the wheel), the resulting configuration is often fairly loose and sloppy. This can be easily verified by inspection of any casters of this type. Simply moving the wheels by hand shows the amount of 'play' in the assembly and lack of inherent design stability. Note these effects multiply over time as the friction in the joints further moves the features from the design ideals.

Both types of casters, additionally, suffer common drawbacks. In its most common embodiment, the wheels turn on the axle, relying on sliding friction to afford rotation. This type of friction is not as smooth and efficient as other types of motion. Additionally, over time the friction removes material in the hole, creating a larger hole and subsequent 'wobble' as the tight fit in the axle is lost.

Also, both casters rely on the wheels transferring load to axles located at the exact centerline of the wheel(s). This, at first glance, appears to be the most rational design dating back to the original wheel-about-axle. Certainly, this configuration is most stable for wheels turning very quickly, for example bikes or motorcars. But for wheels whose primary purpose is to carry load and turn at very slow rotational speeds (5 rpm and often, for long periods of time, zero), the center axle is not ideal. Under many loading instances, the wheels impart a moment about the wheel centerline perpendicular to the direction of travel, such as in turning of the caster. This moment occurs because the force on the wheel (at the floor contact) is multiplied by the distance to the axle, the wheel radius. This moment adds more loading of the aforementioned wheel/axle joint, further decreasing the inherent stability of the overall device.

Finally, there is a common failing in casters of either of the common designs. Needless to say, a caster is of no use by itself. The sole purpose of a caster is to provide greater functionality (ease of movement) to the overall object (office chair). As a piece of a greater whole, the caster should have the ability to enhance the overall design characteristics of the chair. This may be accomplished by replicating design features from the rest of the chair, using consistent materials, or in other ways complimenting the overall intent of the chair design. With the 'twin caster' design, the prominent wheels with their solid center walls, located on the outside of the device dominate the appearance of the caster assembly. This leads to few opportunities to customize this type of caster for a specific chair design.

With few opportunities for differentiation in the wheel, this caster design leads to the device being featured on almost all furniture products today without sharing any design traits (materials, color, design features) with the entire chair. Caster designs remain consistently the same from chair to chair, manufacturer to manufacturer, year to year.

The relevant prior art includes U.S. Pat. No. 4,045,096, a rotor is mounted within a shroud, and various embodiments of roller bearings are shown for mounting the rotor to the shroud. In U.S. Pat. No. 4,465,321, a hubless wheel is mounted within a fender that describes less than a full circle. The wheel is collapsible, and is supported by the surrounding fender. U.S. Pat. No. 5,248,019 shows motorcycle and bicycle constructions that use hubless wheels. The wheel is apparently mounted to the fixed rim with one bearing. U.S. Pat. Nos. 5,419,619 and 5,490,719 relate to a bicycle construction. Both are directed to the precise angular spacing of the bearings mounted on the fixed hoop of a hubless wheel assembly, and appear to rely on four bearings unequally spaced bearings.

BRIEF SUMMARY OF THE INVENTION

The present invention generally comprises a hubless caster device for use with furniture, equipment, carts, and other conveyances. This new device provides better stability, better rolling functionality, and many flexible design implementations.

In these respects, the hubless caster substantially departs from the conventional concepts and designs of the prior art, and in so doing provides an apparatus primarily developed for the purpose of a unique caster for use in office furniture or equipment.

The hubless caster shares some basic features with prior art caster designs: the central base component providing structure and a vertical pin, which attaches the central base component to the chair and allows the caster to pivot about the vertical pin. However, the present invention is unique in a very fundamental way, which provides great advantages over existing art. The device employs two wheels, each located at opposite ends of the base. The wheels are not disc shaped as is most common. Rather, the wheels are annular (doughnut shaped) with no central disk wall or any other structure inside the opening that extends through the annulus. Thus the largest, most visually dominant portion of the typical prior art designs is eliminated, The outside diameter of the wheel is circular and smooth, for efficient ground-engaging contact. The inside diameter is provided with a toroidal groove that is adapted to receive roller bearings, either cylindrical or ball type. The central base component includes a ring body, and two arrays of roller bearings are disposed at opposed sides of the ring body, each array engaging the groove of one of the wheels. The bearings support the wheels and permit rolling friction of the wheel about an axis defined by the centering ring portion of the base. The two wheels share a common ring body but do not share a common axle, bearings, nor support groove, so that each wheel is free to rotate independently. By eliminating the common center axle, the need for the center section of the base is obviated. Thus the wheels and the center base are open through-and through, greatly altering the visual appearance (compared to prior art designs) by permitting light to pass through the center of the caster assembly.

The use of rolling bearings allows better rolling as line friction has been virtually eliminated. Of course, bearings are very commonly used in wheel applications, mostly as ball bearings. However, in this invention the bearing arrangement differs in that the balls ride in grooves that are integral to the wheel and the base. Also, the bearings are not concentrated close to the axis of symmetry, as in central axle designs in the prior art, but are spaced apart near the outside diameter of the wheel where the wheel makes contact. This location provides a far more stable wheeled device in that any side loads (moment) are not transmitted via a lever arm (the radius of the wheel) further out to the center of rotation. The loads are transmitted to the bearings, which occupy a minimum space, thereby reducing the lever arm and providing less play in the system. Also, the grooves 'capture' the bearings very tightly (each ball surrounded by four planes). In this way, the balled joint has very little play and greatly reduces any wobble that occurs when a wheel is simply supported by an axle.

The elimination of the small diameter central axle enhances stability by virtue of the geometry of the mechanics of the assembly. Stiffness of a section is enhanced by geometry in which features are far from the center of neutral axis. (I.e., a pipe is stiffer than a rod if both are made of same material and employ same amounts of material.) With the wheels (via the bearings and centering ring) riding on the base directly (and not on an axle), the entire base becomes sole support for the wheels, with the enhanced effects of better stiffness and therefore a more stable overall device. Additionally, the base is far stronger than a simple axle and is more resilient to any impact on the device, hence it has better longevity.

The elimination of a central axle and the material that would normally surround it in the base provides the hubless caster with a distinct advantage over the existing art. This 'hubless' feature removes the visual prominence of the wheel and allows the base (in its simplified form) to be more apparent. This leads to greater opportunities to customize the caster by incorporating design elements of the overall design of the end device, such as a chair or furniture item or skateboard. If left open, the hubless caster will allow a skateboard or chair itself to appear to be 'floating'. If desired, the central hubless area may be used to add features that are consistent and/or distinctive with the entire chair such as holes, cutouts, different colors, imprinted logos, reflective surfaces, translucent materials, similar materials, fabrics, and so on. The ease of customization will allow an infinite number of possible customizations to allow the hubless caster to be tailored for visual distinctiveness and design conformance with the overall aesthetic. This feature makes it very distinctive over the ubiquitous black twin wheeled caster.

DETAILED DESCRIPTION OF THE INVENTION

Figure 1:
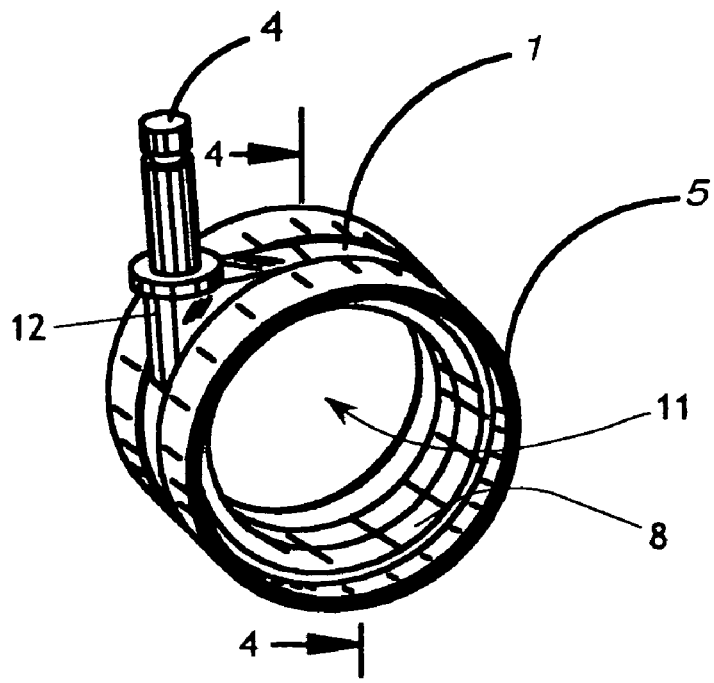
FIG. 1 is a perspective view of the hubless caster depicting overall part geometry and hubless center portion along with the king pin component.
Figure 2:
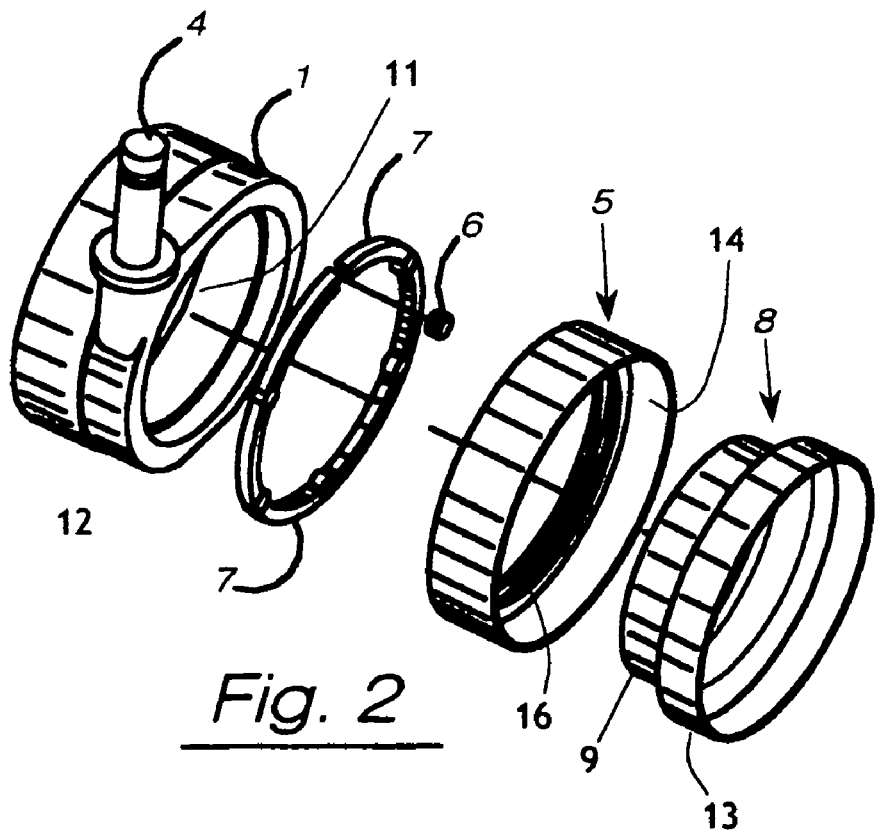
FIG. 2 is an exploded view of the hubless caster assembly showing the internal mechanical components.
Figure 3:
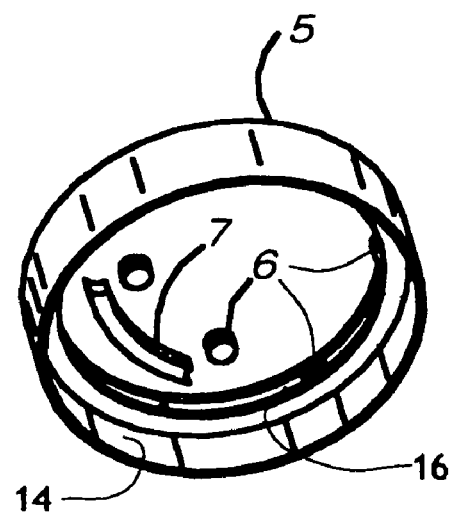
FIG. 3 is a detail depicting location of bearings and retainers in relation to the wheel.
Figure 4:
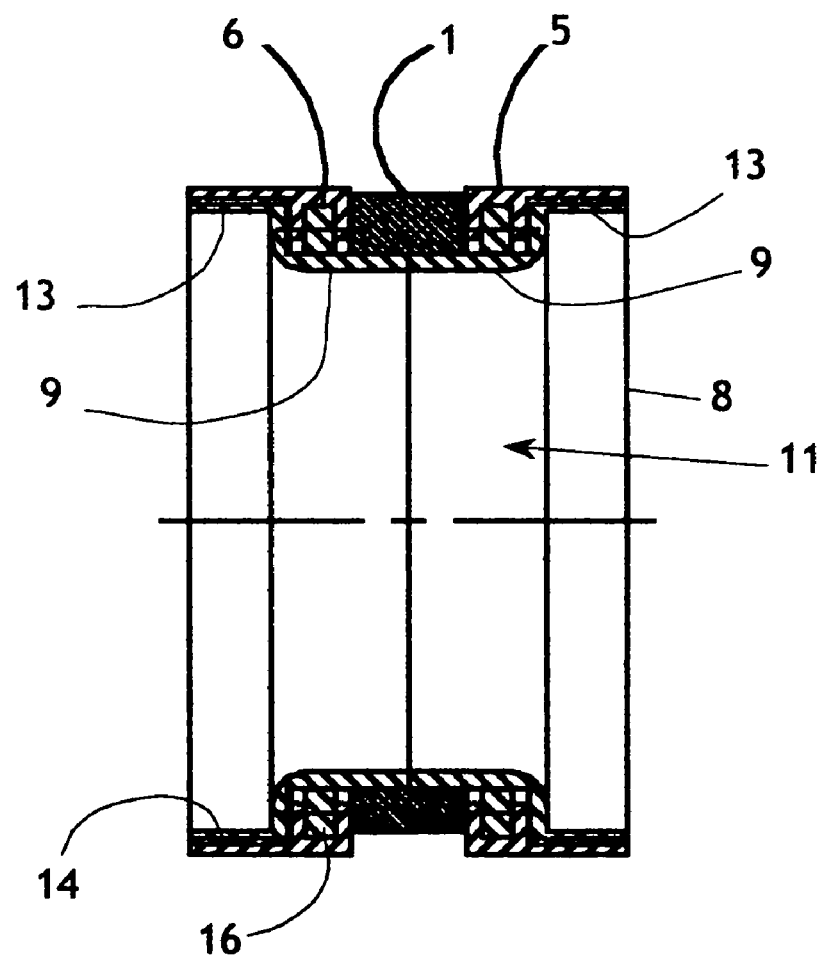
FIG. 4 is a cross section view of the hubless caster assembly, taken along line 4—4 of FIG. 1, showing relevant part mating geometry.

The present invention generally comprises a hubless caster assembly for use with furniture, equipment, carts, and other conveyances. This new device provides better stability, better rolling functionality, and many flexible design implementations.

With regard to FIGS. 1–4, the hubless caster assembly includes a ring body 1 having an open center portion 11. A kingpin 4 extends outwardly from the ring body 1 and is supported by an integral boss 12. (In the drawings, similar reference characters denote similar elements throughout the several views.) The kingpin may be received in a generally vertically oriented receptacle for pivoting motion about the kingpin axis, as is known in the prior art. The assembly also includes a centering ring 8, which is provided with an annular body 13 and a reduced diameter portion 9 extending coaxially from the body 13. A toroidal wheel 5 includes an outer surface adapted to be ground-engaging, and an inner annular surface 14. A bearing race groove 16 is formed in the surface 14 at the inner end thereof. A plurality of bearings 6 are disposed in the race groove 16, interspersed with bearing spacers 7 that maintain the spacing of the bearings 6. The bearings 6 may be rollers, balls, or the like. The inner diameter of the race groove 16 is sufficiently small to clear the outer surface of the portion 9 of centering ring 8, so that each wheel 5 is supported by the bearings 6 for rotation thereabout. Likewise, the inner diameter of portion 14 of each wheel 5 is greater than the outer diameter of portion 13 of the centering ring, so that the wheels are free to rotate about their respective centering rings. The wheels thus rotate independently, and are capable of counter-rotating, as when the caster is pivoted about the kingpin 4. The close spacing of the centering ring surfaces to respective confronting surfaces of the wheels serves to limit the intrusion of dirt into the bearing space.

Figure 5:
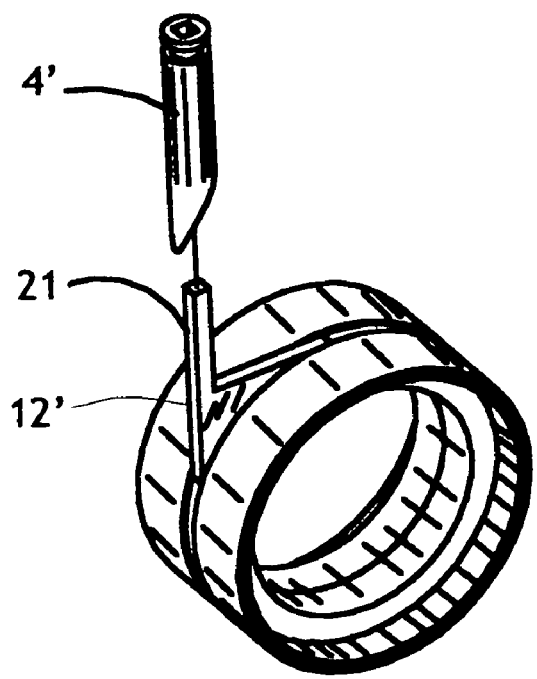
FIG. 5 is an exploded view of a further embodiment of the hubless caster utilizing a thinner structural frame which allows the king pin device to be customized.
Figure 6:
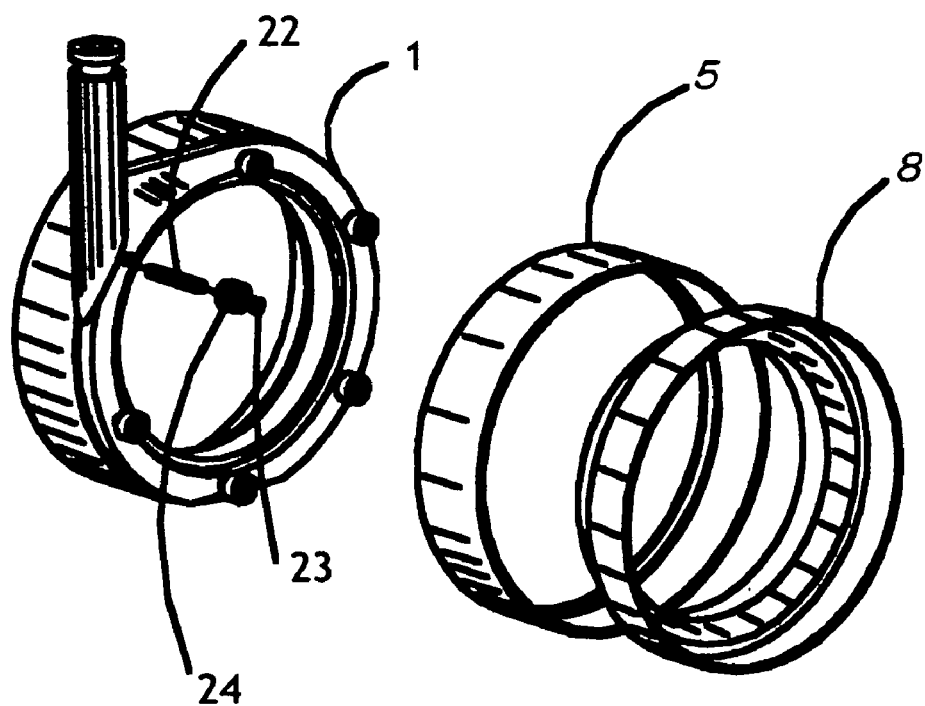
FIG. 6 is an exploded view of a further embodiment of the caster using rollers rotating about pins fixed to the base of the device.

With regard to FIGS. 5 and 6, an alternative embodiment of the hubless caster includes the ring body 1 and the kingpin 4' extending from a boss 12'. In this embodiment, the king pin 4' is reinforced by incorporation of an extension 21 of the structural frame from its interior ring portion 1, allowing the king pin to function as before but without the need to be a rigid structural piece. In this embodiment, a plurality of pins 22 extend outwardly from each side of the ring body 1, and a plurality of roller bearings 24 are each secured on the end of one of the pins 22 by retainer 23. The wheels 5 and centering rings 8 function substantially as described previously. In this embodiment, no bearing spacers 7 are required. Also the pins and their roller bearings may be arrayed in unequally spaced fashion about the ring body; for example, more of the bearings may be disposed at the lower half of the ring body to absorb the primarily vertical load on the wheels.

Figure 7:
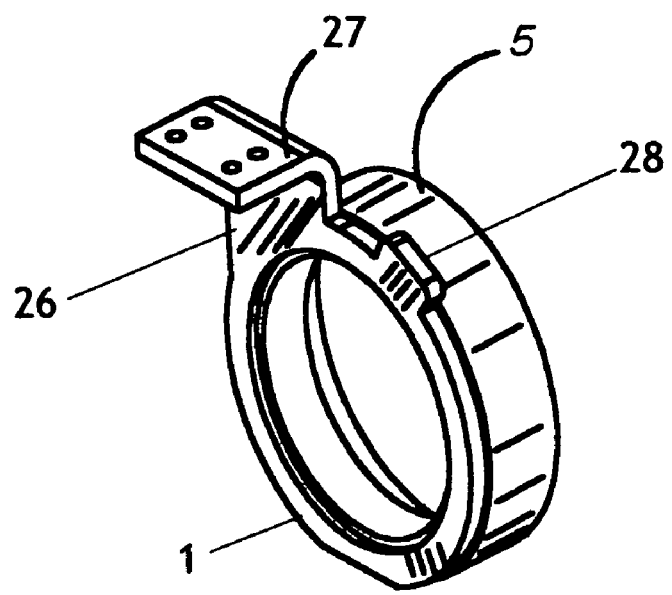
FIG. 7 is a detail perspective view showing a further embodiment of the device in which the frame contains features to allow accessory devices such as brakes, fenders, and keep-out safety devices as well as different structural attachment methods to be employed.

With reference to FIG. 7, the ring body 1 may extend in a nominal plane, and a connector member 26 may extend from the ring body in the same plane. The distal end of the connector member 26 terminates in a right angle flange 27 having bolt holes for attachment to an object or piece of furniture. The flange 27 and the lug 28 to allow accessory devices such as brakes, fenders, and keep-out safety devices as well as different structural attachment methods to be employed.

Note that the wheels and retaining rings have open central portions that correspond to the opening 11 in the ring body. Thus the caster assembly has no hub, no center, and thus is much less massive in appearance than prior art casters that have solid disk wheels and central bodies. Light passing through the aligned openings causes the caster assemblies to become rather unnoticeable, so that the furniture item appears to 'float' on the floor.

Figure 8:
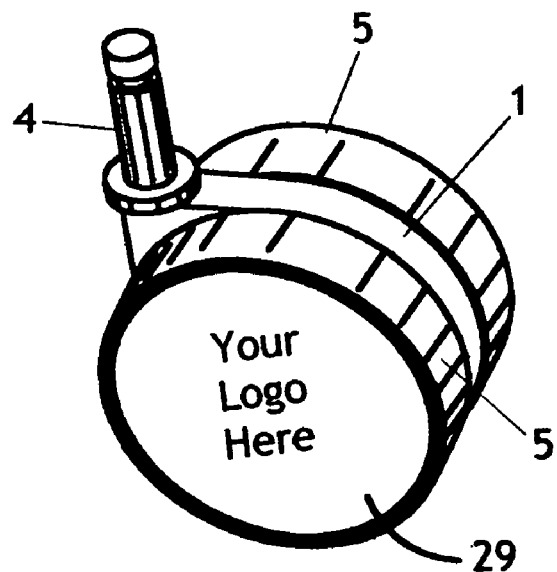
FIG. 8 is a perspective of a further embodiment of the hubless caster in which the open hubless portion of the device is provided with a decorative hub.
Figure 9:
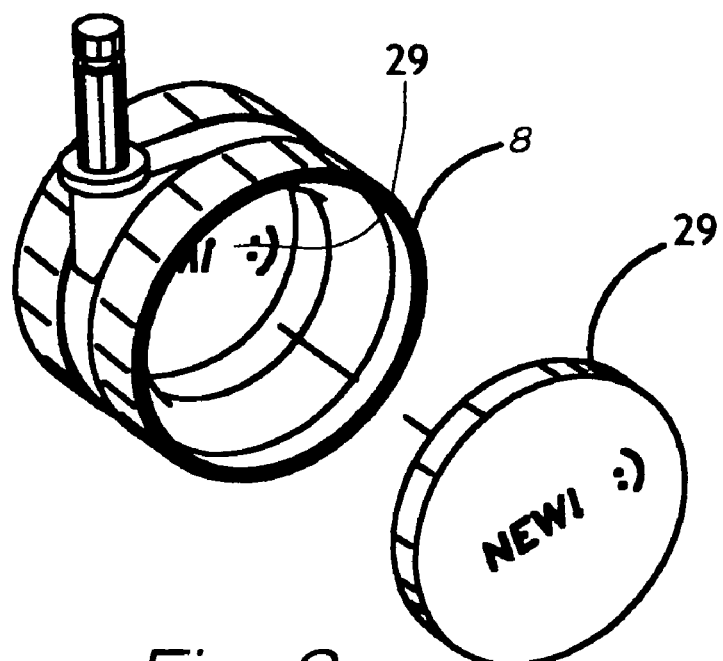
FIG. 9 is an exploded view showing the relationship of the decorative hub and hubless caster of FIG. 8.

On the other hand, the hubless feature may be exploited in an opposite manner. As shown in FIGS. 8 and 9, a hub cap 29 may be affixed to the opening of at least one centering ring 8 of a caster assembly of the invention. The hub cap 29 may bear a manufacturer's logo, or decorative imagery or indicia, or fabric covering to match the upholstery of a chair, or wood grain to match a desk, or the like. If the hub cap 29 is transparent or translucent, transmitted light will illuminate a logo or indicia borne thereon. The hub cap 29 is not necessary as a structural element, and may be removable, or replaceable. Note that the diameter of the cap 29 is only slightly less than the diameter of the wheels 8, so that the caps 29 dominate the visual appearance of the caster assembly. Thus there is ample opportunity to stylize the appearance of the caster assembly in connection with the appearance and design of the end use item supported by the caster assembly.

Figure 10:
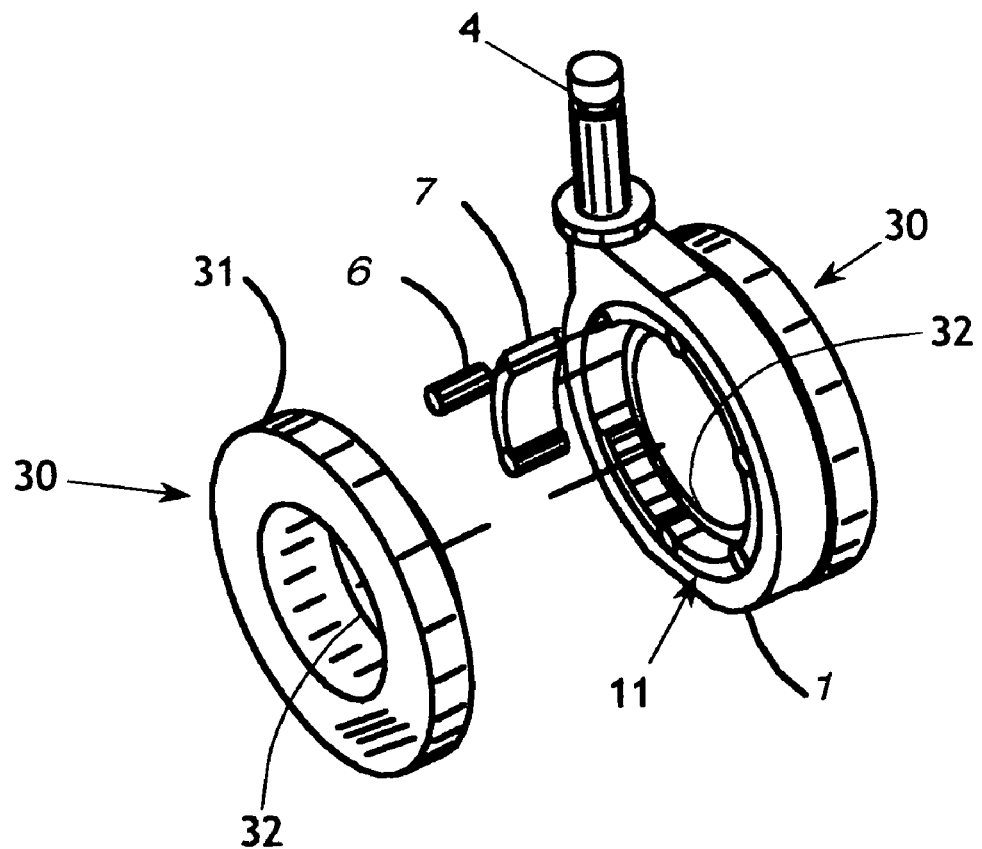
FIG. 10 is an exploded view of a further embodiment of the device in which the two wheels are attached to each other in a hubless design.

With reference to FIG. 10, a further embodiment of the hubless caster includes the ring body 1 and kingpin 4 extending therefrom. In this embodiment the opening 11 of the ring body is configured as a bearing race, and the roller bearings 6 and spacers 7 are arrayed about the inner surface of the opening 11. Each wheel 30 is an annular object having an outer tread portion 31 and an inner neck 32 that extends through the bearing assembly to join the neck 32 of the wheel 30 on the opposite side of the ring body 1. The necks 32 engage the bearings 6 to rotate freely therein, and the wheels 30 are joined for rotation in common. This embodiment eliminates the centering rings, and simplifies manufacturing and parts count. It may be advantageous in situations where a caster is fixed in direction, in which case the kingpin may be replaced by a non-pivoting mounting, as shown for example in FIG. 7.

Figure 11:
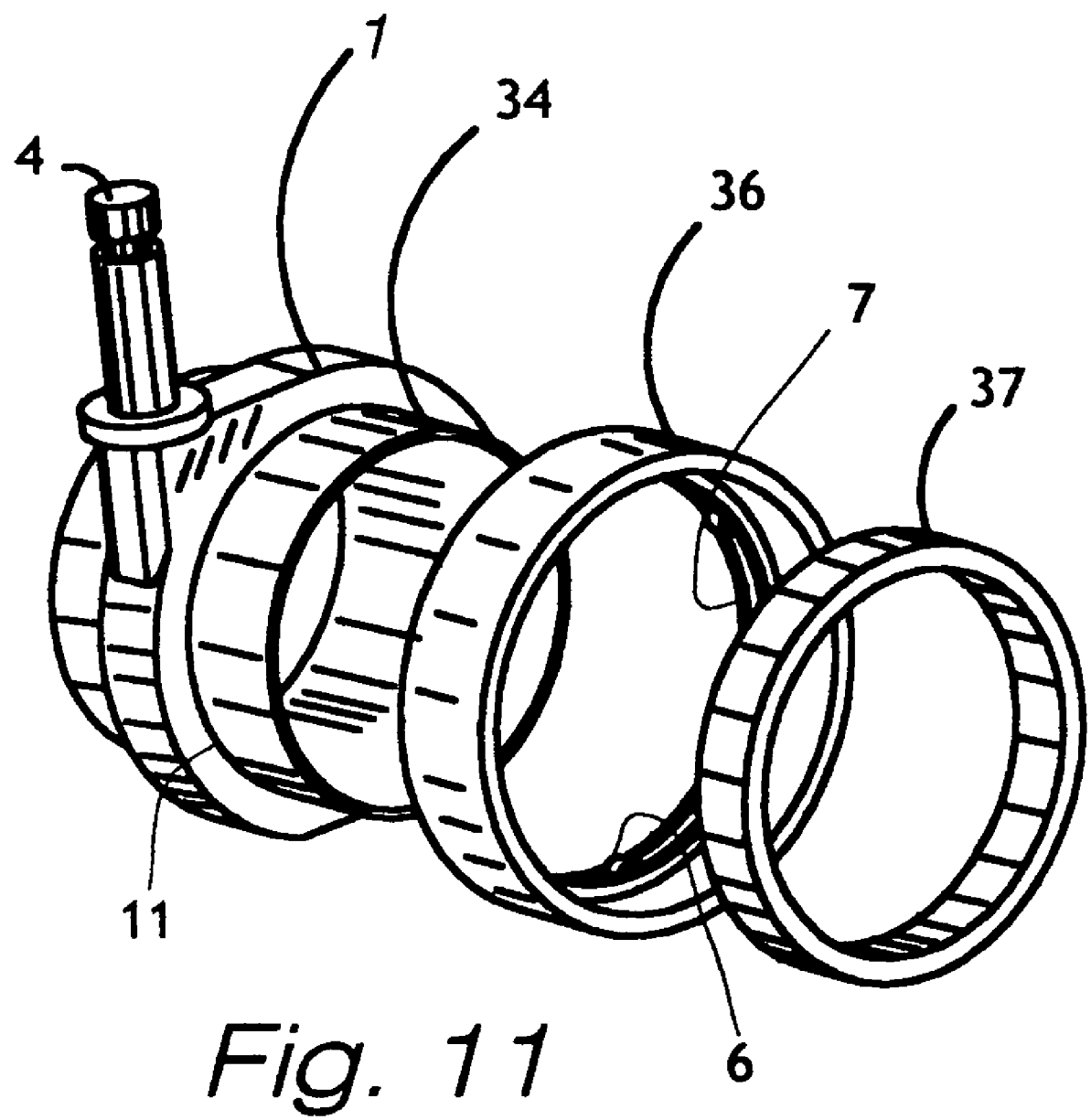
FIG. 11 is an exploded view of a further embodiment of the device in which a structural tube is fixed to the base. The tube carries the load, allowing the frame to be made of lower strength material than previous embodiments (for example, plastic instead of a metal).
Figure 12:
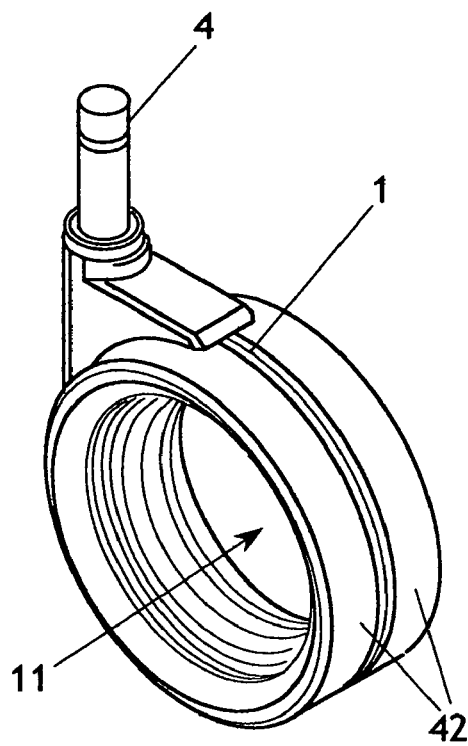
FIG. 12 is a perspective view of a further embodiment of the hubless caster of the present invention.
Figure 14:
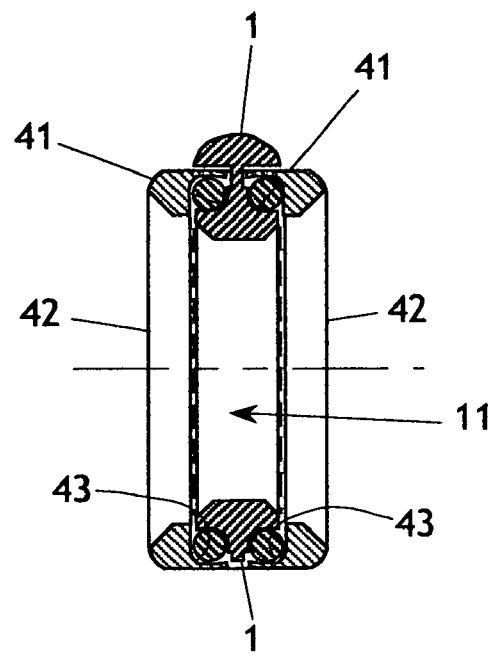
FIG. 14 is a cross-sectional view taken along line 14—14 of FIG. 13.
Figure 13:
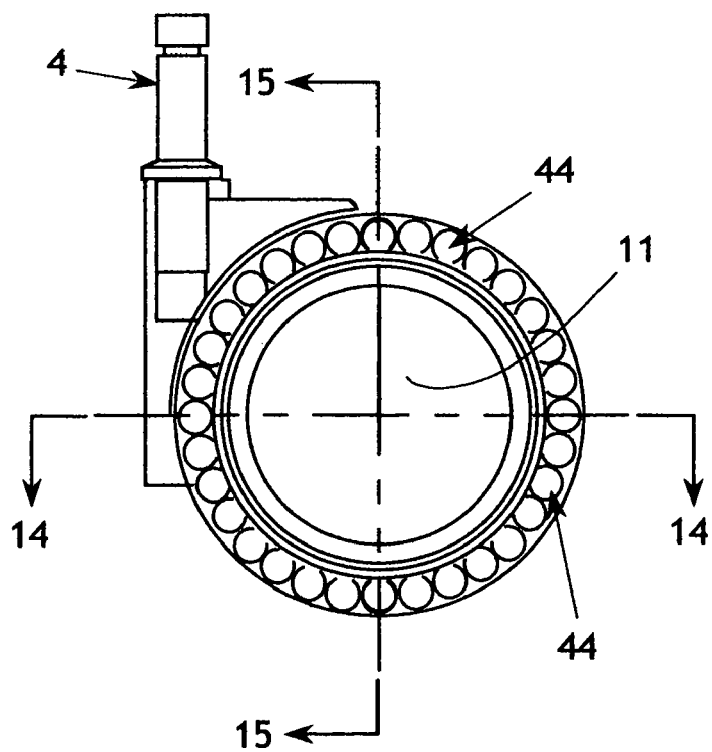
FIG. 13 is a cross-sectional side elevation of the embodiment shown in FIG. 12.
Figure 15:
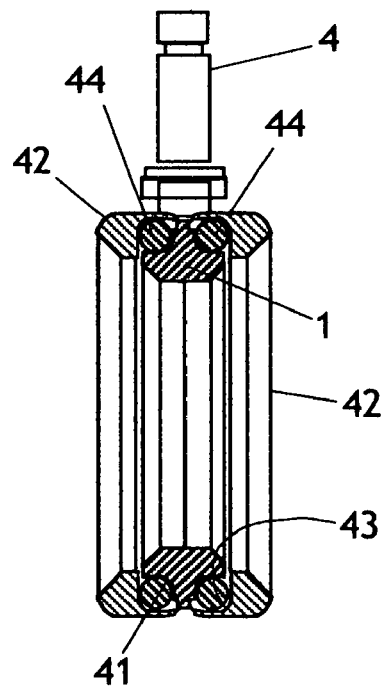
FIG. 15 is a cross-sectional view taken along line 15—15 of FIG. 13.
Figure 16:
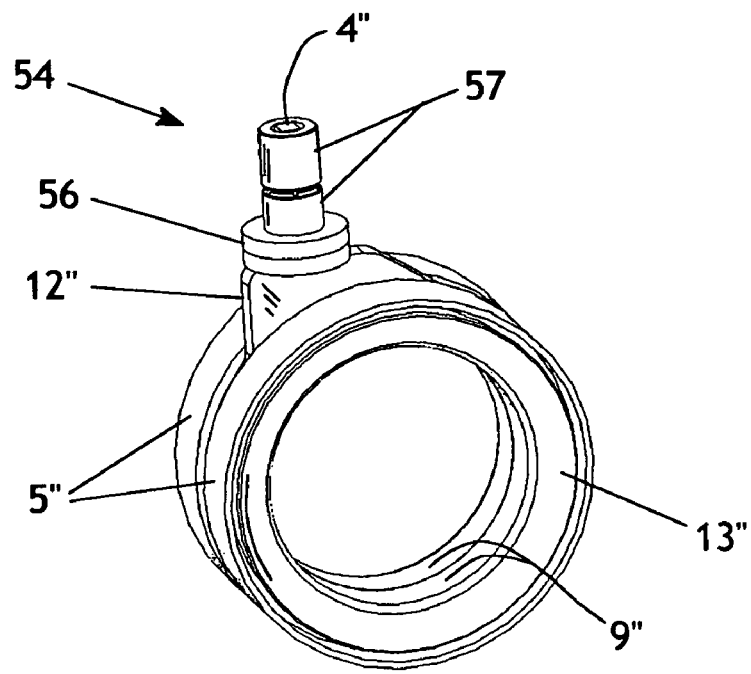
FIG. 16 is a perspective elevation of a further embodiment of the hubless caster of the present invention.
Figure 17:
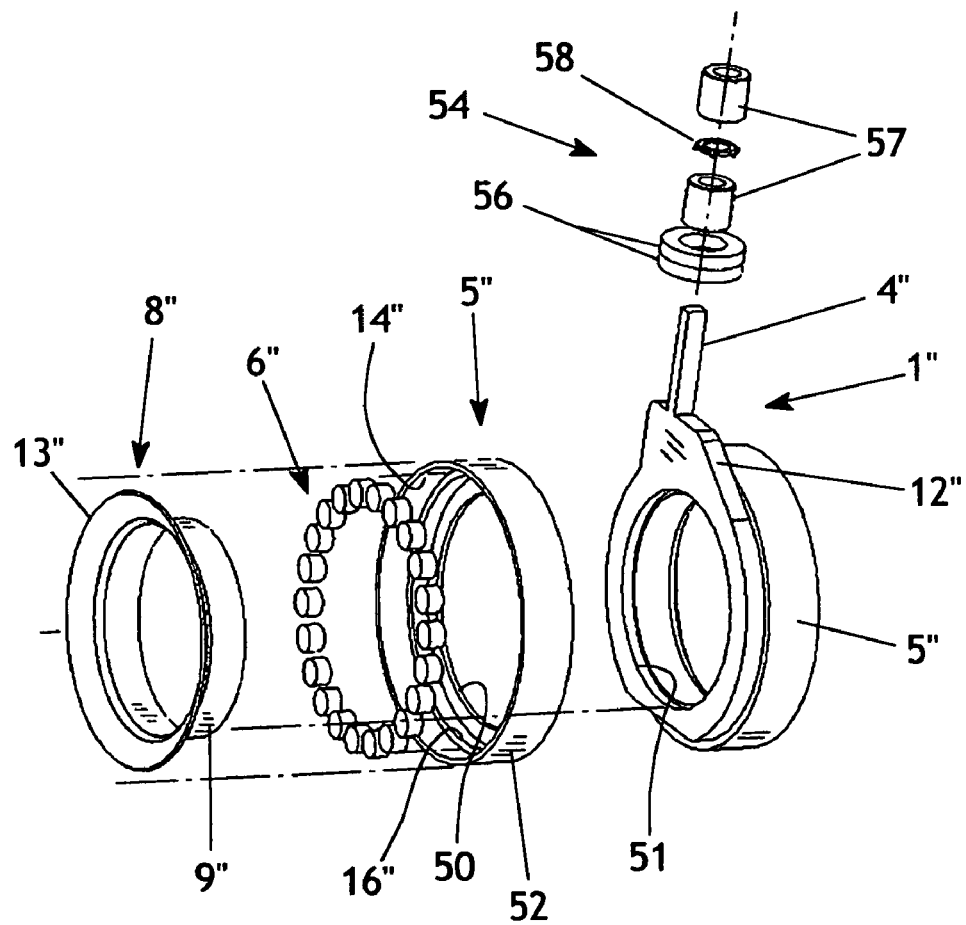
FIG. 17 is an exploded view of the embodiment depicted in FIG. 16.

Another embodiment of the invention, shown in FIG. 11, includes the ring body 1 and kingpin 4 extending therefrom. The central opening 11 of the ring body 1 secures a tube 34 extending rigidly therethrough. A wheel 36 and centering ring 37 are assembled to a respective end of tube 34, with bearings 6 and spacers 7 secured in a race groove (as in the previous embodiments) in the inner surface of the wheel 36. In thus embodiment the wheels rotate independently. The tube 34 carries the load, allowing the body 1 to be formed of lower strength material (for example, plastic instead of a metal) than embodiments described above.

An additional embodiment of the invention, shown in FIGS. 12–15, includes a ring body 1 and kingpin 4 extending therefrom. The ring body 1 is provided with a pair of bearing race grooves 41 extending annularly and coaxially, and disposed on either side of the ring body. A pair of toroidal wheels 42 are provided, each wheel including an annular race groove 43 at an inner surface portion thereof, the outer surface being adapted to ground-engaging contact. The wheels are assembled to their respective sides of the body 1, with the bearing races 41 and 43 disposed in confronting registration to contain a plurality of balls 44 arrayed therein. The wheels 42 rotate independently in low friction rolling motion on the balls 44. Note that the centering ring of previous embodiments is eliminated. The bearing arrangement in this embodiment may comprise the bearings 6 and spacers 7 of previous embodiments.

Another embodiment of the invention, shown in FIGS. 16–19, incorporates components of embodiments previously described, and which are labeled with the same reference numerals with an added double prime (") designation. A body frame component 1" is formed by forging, stamping, blanking, or otherwise shaping a portion of steel web. The body frame 1" includes an open circular center portion 11" having an inner bore surface 51. A rod 4" extends integrally and outwardly within the plane of the body frame 1" and is supported by an integral boss 12", similar to the embodiment of FIGS. 5 and 6. Note that the rod and boss need not be ground or otherwise worked, and that the body frame 1" is substantially constant in cross-sectional thickness and generally planar throughout its extent.

The assembly also includes a pair of centering rings 8", each being provided with a reduced diameter neck portion 9" and an annular body 13" extending coaxially from the neck portion in flange-like fashion. The body 13" and neck portion define a large central opening that is substantially similar to the open center portion 11" and is adapted to be coaxial therewith. A pair of toroidal wheels 5" are provided, each including an outer surface 52 adapted to be ground-engaging, an inner annular surface 14, and an inner flange 50. A bearing race groove 16 is formed in the surface 14 at the inner end thereof. A plurality of roller bearings 6" are disposed in the race groove 16. The bearings 6" may be balls, or the like. The inner flange 50 has an inner diameter that is less than the nominal diameter of the bearings 6", so that the wheel is prevented from being removed from the associated centering ring 9".

Figure 18:
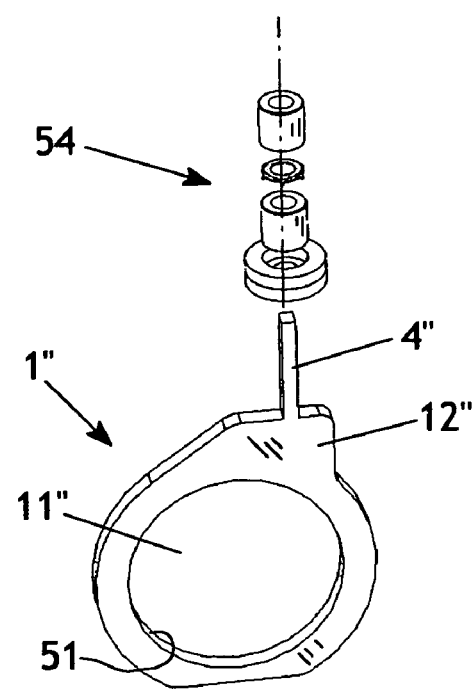
FIG. 18 is an exploded view of the body frame component and, in particular, the spacer and rotational components of the virtual kingpin assembly.
Figure 19:
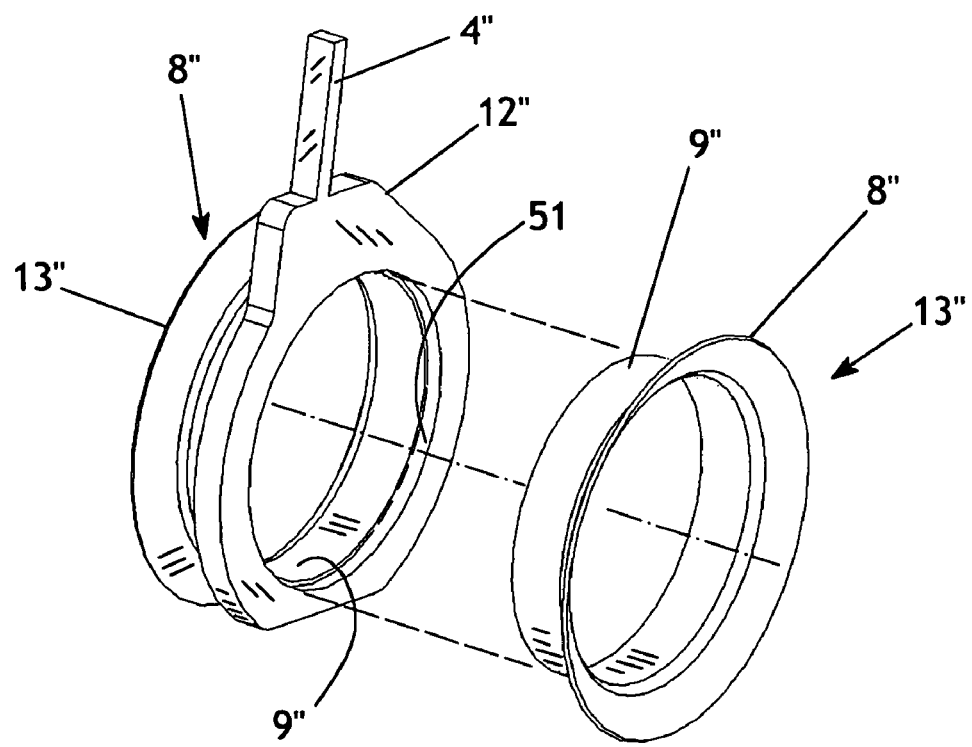
FIG. 19 is an exploded view of the embodiments of FIGS. 16–18, showing in particular the engagement of the centering rings and the body frame component.

The neck portion 9" of each centering ring may be dimensioned to be press fit into the bore 51 and driven approximately halfway into the bore 51, as shown in FIG. 18, so that the two neck portions 9" are substantially abutting. Alternatively, the neck portions 9" may be dimensioned to be secured in the bore 51 by adhesives or the like. The neck portions 9" and the body frame 1" are mutually reinforcing, and the symmetry of the assembly about a vertical plane coincident with the body frame assures a balanced distribution of the load through the body frame.

The inner diameter of the race groove 16" is sufficiently small to clear the outer surface of the portion 9" of centering ring 8", so that each wheel 5" is supported by the bearings 6" for rotation thereabout. Likewise, the inner diameter of portion 14" of each wheel 5" is greater than the outer diameter of portion 13" of the centering ring, so that the wheels are free to rotate about their respective centering rings. The wheels thus rotate independently, and are capable of counter-rotating, as when the caster is pivoted about the rod 4".

The embodiment also includes stacked assembly 54 adapted to be received on the integral rod 4". The assembly 54 includes a pair of spacer washers 56, and a pair of bushings or bearings 57 separated by a locking ring 58. The stacked assembly 54 is dimensioned to be received in a standard mounting hole or receptacle for a caster kingpin, and is designed to be secured therein by the locking ring 58 while permitting rotation of the body frame 1", and all the components assembled thereto, about the longitudinal axis of the integral rod 4". Note that although the integral rod 4" is not intended to be an esthetically pleasing design, it is not visible when joined to the stacked assembly 54 and installed as described above to comprise a virtual kingpin.

The embodiment of FIGS. 16–19 is an improvement over prior comparable designs in the following aspects. It provides a twin wheel hubless design in which both wheels rotate independently. It employs a single body frame component that includes an integral rod that forms a virtual kingpin assembly. The body frame has simple 2-D (flat) geometry with constant cross-section which can easily be made of high strength materials (metals, composites). Metals may be stamped, blanked, or otherwise formed by inexpensive manufacturing methods. The virtual kingpin assembly is internal (unseen) in final assembly, so that non-aesthetic materials may be used, such as unfinished metals, low-grade composites, or the like. Loads from the wheels are transmitted through the rollers to body frame via the centering rings, which allows the centering rings to translate loads in well-distributed fashion and thus enables the centering rings to be made of low strength materials like plastic or the like.

The integral rod 4" of the body frame forms a vertical pin which is the main structural attachment to end item (e.g., chair, furniture item). The rod 4" is enclosed by simple spacers and bushings which provide the circular cross-section and anchoring ring necessary to engage a typical kingpin receptacle. This integral kingpin makes use of the structure of frame, eliminates the need for a separate kingpin (less parts), and is structurally very efficient (fewer structural interfaces and therefore less chance of parts becoming loose). Also, the fully enclosed rolling elements reduce risk of grit and debris invading the bearings and degrading their functionality.

In all the embodiments described above, the construction shown allows the bearings to rotate about a common centerline, even though there is no shaft or other central structure in the assembly. The load is transmitted from the wheels to the bearings and to the body 1. This design, by providing a large cross-section at the bearing assembly, provides a stiffer structure than a simple axle device. The body 1 is the main structural member and should be constructed of metal and/or strong plastic materials using mass-production (injection) manufacturing techniques or metal stamping. The body, by virtue of not having an axle through the center, allows the center section to be used for different design features more consistent with the overall furniture piece, such as holes, different materials, matching materials or textiles from the chair, and/or other design features replicated from the end use assembly.

The wheels 5 may be made of plastic or metal or rubber or a combination thereof. They may have patterns or textures or color treatments employed in the outside treads. In general, both the centering rings and the wheels incorporate raceways to share the bearings and transmit loads between the wheels to the frame. The raceways are either four flat annular surfaces or toroidally curved surfaces that match the bearing profile. In either configuration, the raceways provide a firm, close-fit with the balls. The shared geometry of the raceway between the wheels and the centering ring is required although the apportionment is not critical. That is, the enclosing cross section must be provided about the bearings but the enclosing features may be in the wheel, the centering ring, and/or may be provided through the addition of spacers.

The caster device described in any embodiment herein is infinitely scaleable. It may be used for very small items to be moved or very large. Its most useable application may be for furniture (seating, storage devices, and desks). The most distinctive and changeable portion of the caster is the unique unused 'center section'. Without need for a central axle, the center base area may be used for design elements (logos, design features, different colors, symbols) or other additional apparatus (level-measuring devices, stationary brakes, odometers, illumination, etc).

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A hubless caster assembly, including:

a body frame comprised of a generally planar member having a large diameter central bore extending therethrough, and a rod portion extending integrally and within the plane of said planar member, a pair of centering rings, each having an neck portion and a flange annular portion extending from an outer annular edge of said neck portion;

each neck portion of said centering rings being secured in a respective end of said large diameter central bore of said body frame;

a pair of toroidal wheels, each having an inner annular surface extending concentrically about the neck portion of a respective centering ring and spaced apart therefrom;

a pair of bearing races, each formed in a respective one of said inner annular surfaces of said wheels; and, a plurality of bearings disposed in said bearing races and engaged in rolling contact with each of said neck portions and the respective inner annular surface to support said wheels in independent, freely rotating fashion about said central bore.

2. The hubless caster assembly of claim 1, wherein said body frame further includes an integral rod extending in the nominal plane of said planar member, and stacked assembly means joined to said integral rod to form a kingpin assembly.

3. The hubless caster assembly of claim 2, wherein said stacked assembly means includes at least one bushing dimensioned to be secured about said integral rod.

4. The hubless caster assembly of claim 2, wherein said stacked assembly means includes at least one retaining ring dimensioned to be secured about said integral rod.

5. The hubless caster assembly of claim 2, wherein said stacked assembly means includes an outer cylindrical configuration dimensioned to be secured in a furniture kingpin receptacle, whereby the caster assembly is free to rotate about the axis of the kingpin receptacle.

6. The hubless caster assembly of claim 1, wherein said plurality of bearings includes a plurality of rollers.

7. The hubless caster assembly of claim 1, wherein each of said wheels includes an inner flange extending from an inner annular surface, said inner flange retaining each wheel on the respective centering ring.

8. The hubless caster assembly of claim 1, wherein said neck portion of each centering ring is secured in said central bore of said body frame by at least one of the following processes: press-fitting, bonding, or welding.

9. The hubless caster assembly of claim 2, wherein said central bore, centering rings, neck portion, wheels, and bearing races all extend about a common axis of symmetry.

10. The hubless caster assembly of claim 9, wherein said axis of symmetry is perpendicular to said generally planar member.

11. The hubless caster assembly of claim 10, wherein said integral rod extends along a second axis that is perpendicular and non-intersecting to said axis of symmetry.

12. The hubless caster assembly of claim 1, further including a decorative center cap adapted to be secured in at least one of said centering rings.

\* \* \* \* \*